United States Patent

Bergmann

[15] 3,679,943

[45] July 25, 1972

[54] CAPACITOR ASSEMBLY HAVING ELECTRODE AND DIELECTRIC LAYERS OVERLAPPED FOR SEALING

[72] Inventor: Michael J. Bergmann, Nurnberg, Germany

[73] Assignee: E. I. du Pont de Nemours and Company, Wilmington, Del.

[22] Filed: April 20, 1971

[21] Appl. No.: 135,703

[52] U.S. Cl. ....................317/230, 317/261

[51] Int. Cl. ....................H01g 3/06, H01g 9/10

[58] Field of Search ....................317/230, 261

[56] References Cited

UNITED STATES PATENTS

| | | | |
|---|---|---|---|
| 2,504,178 | 4/1950 | Burnham et al. | 317/230 |
| 3,320,484 | 5/1967 | Riley et al. | 317/101 |
| 3,502,949 | 3/1970 | Seki | 317/230 |
| 3,523,221 | 8/1970 | Tierman et al. | 317/230 |

*Primary Examiner*—James D. Kallam
*Attorney*—James A. Forstner

[57] ABSTRACT

In an electrical capacitor with electrodes and an intermediate dielectric layer successively printed on a dielectric substrate, the improvement of so disposing the electrodes to minimize exposure of the dielectric layer to the atmosphere, and thus decrease the moisture sensitivity of the capacitor. Optionally, all exposed metallizations may be covered by a layer of solder.

5 Claims, 8 Drawing Figures

PATENTED JUL 25 1972

3,679,943

INVENTOR
MICHAEL BERGMANN

BY James A. Forstner
ATTORNEY

CAPACITOR ASSEMBLY HAVING ELECTRODE AND DIELECTRIC LAYERS OVERLAPPED FOR SEALING

BACKGROUND OF THE INVENTION

The present invention relates to electrical capacitors, and more particularly, to electrical capacitors which exhibit decreased sensitivity to moisture due to minimized exposure of the dielectric layer to the atmosphere.

It is known to produce multilayer capacitors by the so called thick-film technique as follows. The first electrode and the conductor patterns are printed on, for example, a ceramic substrate using a paste of silver, gold or other conductors. This initial metal printing is then fired onto the ceramic substrate. Thereafter, a ceramic layer is applied (for example, by screen printing) on the electrode of the capacitor, and then the ceramic layer is fired to form a dielectric, which in the final capacitor will be intermediate between the above-mentioned electrode and the counterelectrode thereafter applied and fired. Further, it is known to apply over such printed capacitors an encapsulant layer of organic material, such as lacquer, or a vitreous layer, to serve as protection against moisture and mechanical damage.

It is also known to produce such capacitors by the evaporation or thin-film technique. In this case, a final layer of silicon dioxide, for example, is evaporated onto the top of the capacitor to minimize sensitivity to moisture.

SUMMARY OF THE INVENTION

In an electrical capacitor comprising a dielectric substrate having thereon (a) metallizations consisting of an electrode and a counterelectrode and (b) a dielectric layer separating the electrode and the counterelectrode (the electrode, dielectric layer and counterelectrode appearing in successive layers on the substrate), this invention provides the improvement of capacitors in which all but a small area of said dielectric layer is overlapped (i.e., covered) with said metallizations. Thereby, the exposure of the dielectric layer to the atmosphere is minimized, and, therefore, the sensitivity of the dielectric layer and hence the entire capacitor to moisture is reduced.

According to a preferred embodiment of this invention, the capacitor additionally comprises, on all the exposed surfaces of said electrodes, a layer of solder, which may be applied by dipping or by solder paste techniques.

A more detailed embodiment of this invention is an electrical capacitor comprising, a conductor layer (a) on the substrate, layer (a) comprising electrode areas (b) and (c) and a narrow connection strip (d) between areas (b) and (c) and electrically continuous therewith;

a dielectric layer (e) covering electrode area (b) and overlapping the edges of (b) and also covering the part of strip (d) which is adjacent to area (b);

and a counterelectrode (f) covering dielectric layer (e) and overlapping the edges thereof, except in the area of connection strip (d).

Thus, as viewed from above, this capacitor exhibits electrode area (c), part of connection strip (d), a narrow part of dielectric layer (e), and then the counterelectrode (f). This embodiment is particularly useful as a discrete chip capacitor in which electrode areas (c) and (f) may be used for attachment of the capacitor to a hybrid substrate.

A further detailed embodiment of this invention is that wherein the above electrical capacitor comprises, in the following sequence, a conductor layer (a) on the substrate, layer (a) comprising an electrode (b) and a narrow connection strip (c) electrically continuous with the electrode (b);

a dielectric layer (d) covering electrode (b), overlapping the edges of (b) and also covering the part of strip (c) which is adjacent to the electrode (b);

and a counterelectrode (e) covering dielectric layer (d) and overlapping the edges thereof except in the area of connection strip (c).

Each of the detailed embodiments of this invention may additionally comprise a layer of solder over the outermost metallizations, that is, those which are exposed to the atmosphere.

The capacitors of the present invention may comprise a narrow capacitance balancing strip in the electrode.

The capacitors of the present invention may be made by screening or evaporation techniques, and firing after the deposition of each layer may be accomplished.

DETAILED DESCRIPTION

The capacitors of the present invention may be of two types. The first type includes capacitors printed directly on a ceramic substrate along with conductor metallizations, to which substrate other elements (e.g., resistors) are printed or attached. These may be termed capacitor components of hybrid circuit boards. This embodiment may be illustrated, for example, by the capacitor of FIG. 1, where the substrate area approximates that of the capacitor. The second type of capacitor includes discrete capacitor chips, which may be fabricated separately and then subsequently bonded to an electronic circuit, for example, with lead wires or by direct solder connection of the circuit to the chip capacitor.

By the present invention the problem of reducing capacitor sensitivity to moisture in a simple and inexpensive manner is solved. The top electrode of the capacitor accordingly exhibits increased conductivity, resulting in decreased electrical loss.

Figure 1:
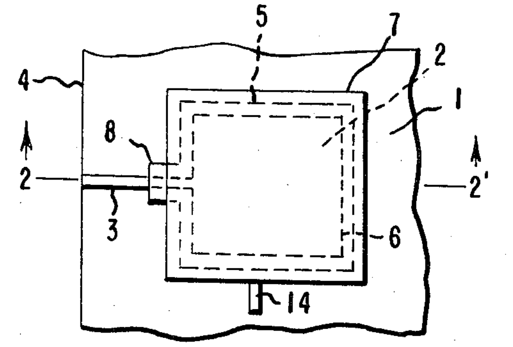
FIG. 1 shows a schematic top view of a capacitor according to this invention printed on a ceramic substrate, with a narrow metallic connection strip.

The capacitors of the present invention may be produced as follows. FIG. 1 capacitors may be produced by applying to a ceramic substrate an electrode and a narrow connection strip leading therefrom, subsequentially applying a dielectric layer in such a manner that it protrudes over all the edges of the electrode and also covers that part of the connection strip which is adjacent to the electrode, and subsequently applying a second electrode (counterelectrode) in such a manner that it protrudes over all the edges of the dielectric layer, with the exception of the area of the dielectric layer which was printed over the connection strip. In this design, practically all of the dielectric layer is covered by the second electrode, with the exception of the small area of dielectric which covers part of the metallic connection strip. Thus, practically the entire dielectric layer is protected against moisture penetration.

Further protection against moisture penetration of such capacitors is achieved by coating the counterelectrode with solder. Soldering may be accomplished by dipping or by encapsulating with solder paste, for example. Not only is the conductivity of the counterelectrode considerably increased by such soldering, but also capacitor electrical losses are decreased. Moreover, this soldering process can also be carried out when, for example, other elements on the ceramic substrate are immersion soldered.

Figure 2:
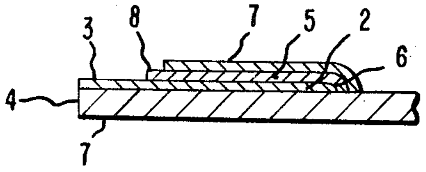
FIG. 2 is a cross-sectional view, taken along the line 2—2′ in FIG. 1, of the capacitor of FIG. 1.

Referring to FIGS. 1 and 2, substrate 1 is of an insulating material, such as glass or ceramic, on which electrode 2 is applied, for example, by screen printing, evaporation, etc. Electrode 2 is provided with a narrow metallic connection strip 3. FIG. 1 illustrates an embodiment wherein the narrow connection strip ends at the edge 4 of substrate 1, thus being adapted for contact with a printed circuit. Optionally, the connection strip need not extend to the edge of the substrate. The connection strip may also be used for soldering other construction elements thereto. For example, connecting lugs or conductor wires of semiconductor devices or other electrical construction parts may be soldered thereto.

Still in FIGS. 1 and 2, electrode 2 is covered with dielectric layer 5 which overlaps all the edges 6 of electrode 2 and also leaves the connection strip 3 only partially covered. Subsequently, according to this invention, the counterelectrode 7 (with connection strip 14) is applied so that it overlaps the edges of the dielectric layer 5 on all sides, with the exception of the portion of 5 which covers the connection strip 3. Thus, a portion 8 of the dielectric layer 5 is not covered by the counterelectrode 7. Subsequently, counterelectrode 7, and optionally the uncovered portion of the connection strip 3, and any other conductor lines on the substrate are coated with solder, so that the counterelectrode is sealed off from moisture, and also so that the dielectric and electrodes lying thereunder are further sealed from moisture. Only in area 8 of the dielectric 5 is there a thin strip through which moisture can penetrate dielectric layer 5. However, this area is so small that the moisture penetration is greatly minimized. So that counterelectrode 7 can be well sealed by solder, a metal or combination of metals are selected for the conductors which will permit good adherence of solder thereto. Such metallizations include, for example, platinum/gold.

It has been found that the dielectric layer is preferably a ceramic to which glass-forming binders have been added. For example, such a dielectric may comprise a mixture of barium titanate with other dielectric ceramic materials and glass components. As less glass-forming binder is added to the ceramic material, the more porous dielectric layer 3 will become, since the degree of densification normally accomplished with dielectrics is not possible in capacitors on hybrid circuit boards, in that high firing temperatures cannot be employed due to the presence of various hybrid circuit elements. Therefore, the higher the dielectric constant of dielectric layer 5, the greater the moisture sensitivity will be. Therefore, the capacitors of the present invention are particularly useful when the dielectric layer 5 is to be printed or evaporated with high dielectric layer 5 is to be printed or evaporated with high dielectric constant masses. In this instance, the narrowness of the connection strip 3 is particularly advantageous, since then a very small dielectric area remains available for moisture penetration.

Figure 3:
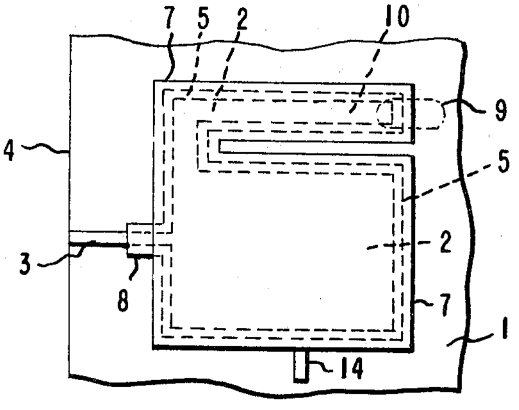
FIG. 3 is a schematic top view of a printed capacitor according to this invention, which has a narrow balancing strip in which trimming may be accomplished.

In FIG. 3 the capacitor of FIGS. 1 and 2 additionally comprises a narrow balancing strip 10, for balancing of the capacitance of the capacitor. The capacitor of FIG. 3 is in principle produced exactly as is that of FIG. 1, except in that the narrow balancing strip is added and is so narrow that it can be just about completely removed by a trimming device. Such trimming devices include a sand blaster with a very fine nozzle, very thin grinding devices, or laser trimmers. In the capacitor of FIG. 3, good capacitance balancing can be achieved by making a very narrow slot in the balancing strip as indicated by the arrow at 9 in FIG. 3. Thus, there is no substantial exposure to moisture through the slot.

In the above and other embodiments of this invention protection against mechanical damage is enhanced where any metallizations exposed to the atmosphere are covered with a relatively thick solder layer.

Figure 4:
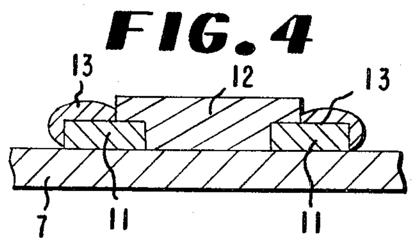
FIG. 4 is a cross-sectional view of part of a balancing capacitor comprising two parallel conductor strips printed on a substrate, with a dielectric layer covering part of the length of each conductor strip and solder covering the remainder of the length of each conductor strip, the cross section being taken along the line 4—4′ in FIG. 5.
Figure 5:
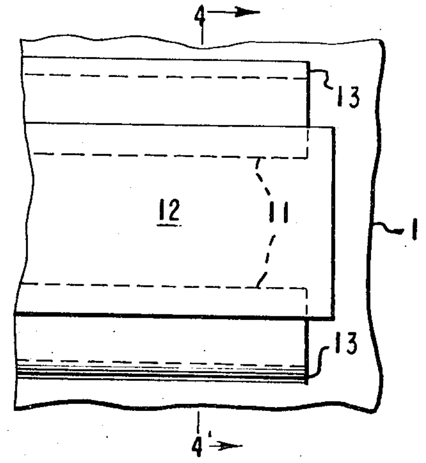
FIG. 5 is a schematic top view of part of the capacitor embodying the balancing capacitor depicted in FIG. 4.

FIG. 4 is a cross-sectional view of part of one embodiment of this invention (taken along the line 4—4′ in FIG. 5) which comprises two parallel conductor strips 11, between which a dielectric layer 12 is applied in such a manner that the layer 12 covers one side of the length of each conductor strip over its entire length. (FIG. 5 is an overhead perspective view of the balancing arm of the capacitor of FIG. 4.) The area of conductor strip 11 not covered by dielectric may be coated with solder 13, e.g., during solder immersion. This results in practically all the lines of force running in dielectric layer 12 and possibly in the substrate so that high capacitance can be achieved. Also, good conductivity is achieved due to solder 13.

Figure 6:
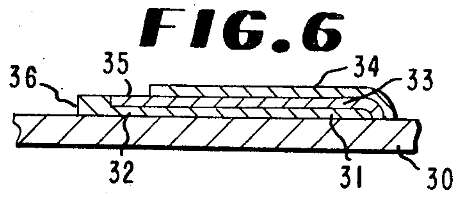
FIG. 6 is a cross-sectional view of a capacitor according to this invention, taken along the line 6—6′ in FIG. 7, wherein the electrode overlaps part of the dielectric layer and the counterelectrode most of the remainder thereof, leaving a narrow area of the dielectric layer exposed.
Figure 7:
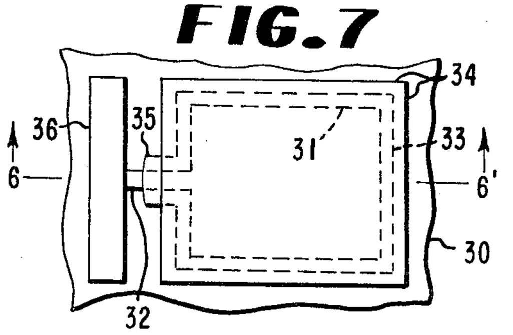
FIG. 7 is a schematic top view of the capacitor of FIG. 6.
Figure 8:
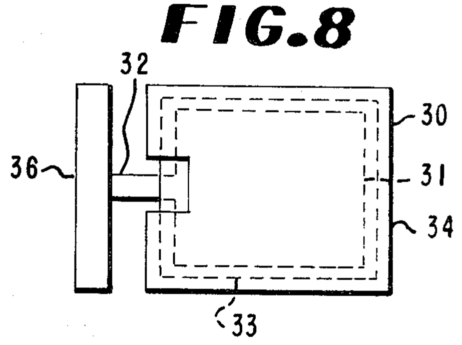
FIG. 8 is a schematic top view of another capacitor of this invention.

The second type of capacitor according to this invention (mentioned above) is discrete capacitor chips, which may be prepared and fired independently, and then attached to a circuit through lead wires or via direct solder connection to a circuit. Preferred embodiments of such capacitor chips are illustrated by the embodiment of FIGS. 6 and 8. For purposes of space conservation, the area of the substrate of such chips should not be significantly larger than the area of the capacitor thereon. The cross-sectional view in FIG. 6 is taken along the line 6—6′ in FIG. 7. Here, an electrode comprising areas 31 and 36 with thin connection strip 32 is printed on substrate 30. Then dielectric layer 33 is printed on 31 and part of 32. Then counterelectrode 34 (and electrode area 36) may be applied; 34 overlaps all of 33 except the small area over connection strip 32.

FIG. 8 is an overhead view of a modification of the capacitor of FIGS. 6 and 7, wherein the electrode areas 36 and 31 are printed with narrow connection strip 32, then dielectric layer 33 is applied over 31 and part of 32; subsequently, counterelectrode 34 is applied over 33, except in the area where 32 protrudes from under 33.

As stated above, in each of the embodiments of this invention, all exposed metallizations may be soldered.

I claim:

1. In an electrical capacitor comprising a dielectric substrate having a metallization thereon forming an electrode and connection means extending therefrom for connecting into electric circuits, a dielectric layer on the electrode, and a counterelectrode on the dielectric layer, the dielectric layer separating the electrode and counterelectrode; the improvement comprising said dielectric layer overlapping the peripheral edge of said electrode, and the counterelectrode overlapping the peripheral edge of said dielectric layer, for reducing the sensitivity of said capacitor to moisture.

2. A capacitor according to claim 1 additionally comprising a layer of solder covering all exposed portions of said connection means and counterelectrode.

3. A capacitor according to claim 1 additionally comprising a narrow capacitance balancing strip.

4. An electrical capacitor according to claim 1 further comprising a second electrode area with said connection means extending to said said second electrode area.

5. A capacitor according to claim 4 additionally comprising a layer of solder covering all exposed portions of said second electrode area, connection means and counterelectrode.

* * * * *